United States Patent [19]

Hentges

[11] 4,034,462
[45] July 12, 1977

[54] METHOD FOR REPAIRING IRON MOLDS

[75] Inventor: Guy Hentges, Residence Toulaire, France

[73] Assignee: Hilti Aktiengesellschaft, Liechtenstein

[21] Appl. No.: 637,930

[22] Filed: Dec. 5, 1975

Related U.S. Application Data

[60] Continuation of Ser. No. 529,841, Dec. 5, 1974, abandoned, which is a division of Ser. No. 423,460, Dec. 10, 1973, abandoned.

[30] Foreign Application Priority Data

Jan. 18, 1973 Germany .......................... 2302410

[51] Int. Cl.² .......................................... B23P 7/00
[52] U.S. Cl. .............................. 29/401 D; 29/522
[58] Field of Search ...................... 29/522, 401, 530

[56] References Cited

U.S. PATENT DOCUMENTS

| | | | |
|---|---|---|---|
| 2,492,579 | 12/1949 | Kahn | 29/522 |
| 3,480,306 | 11/1969 | Hsu | 29/522 X |
| 3,487,745 | 1/1970 | Brunelle | 29/522 |
| 3,629,928 | 12/1971 | Hammerle | 29/402 |
| 3,758,939 | 9/1973 | Galvani | 29/402 |
| 3,768,412 | 10/1973 | Dardick | 85/10 E X |
| 3,802,059 | 4/1974 | Fischer | 29/522 |

FOREIGN PATENT DOCUMENTS

| | | | |
|---|---|---|---|
| 7,233,410 | 8/1972 | Japan | 29/402 |
| 1,186,035 | 4/1970 | United Kingdom | 85/83 |

*Primary Examiner*—C.W. Lanham
*Assistant Examiner*—V. Rising
*Attorney, Agent, or Firm*—James E. Bryan

[57] ABSTRACT

This invention relates to an improvement in the method for repairing a damaged iron mold and similar casting devices by bridging the damaged area with a metal plate and securing the plate by means of fastening elements inserted into apertures in the plate and prepared recesses in the iron mold, the improvement comprising inserting expansible straddling dowels in said apertures and recesses, and expanding said dowels with a powder-force-actuated setting device.

1 Claim, 3 Drawing Figures

U.S. Patent  July 12, 1977  4,034,462
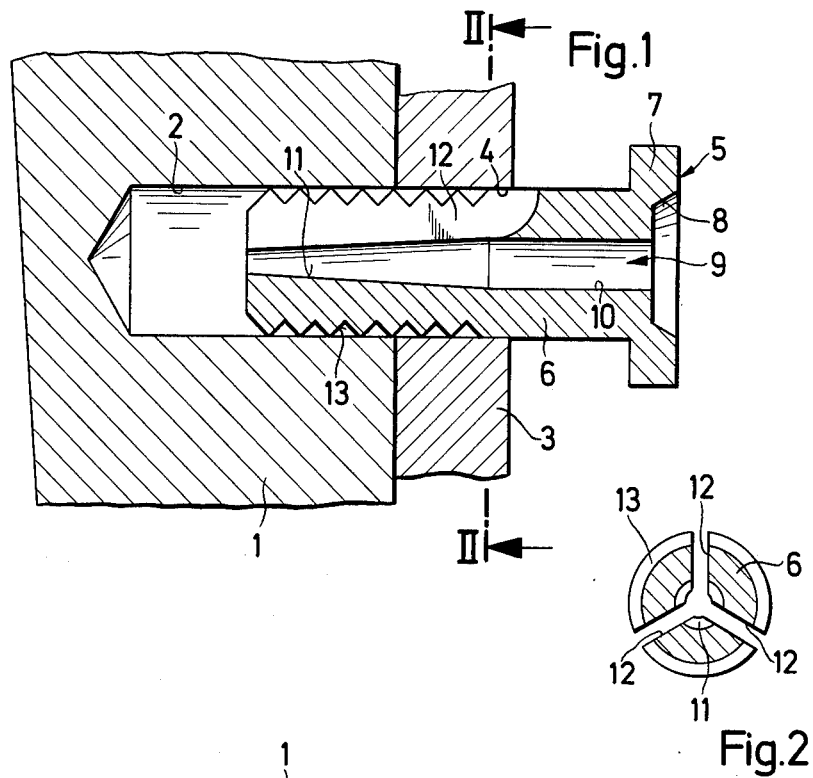
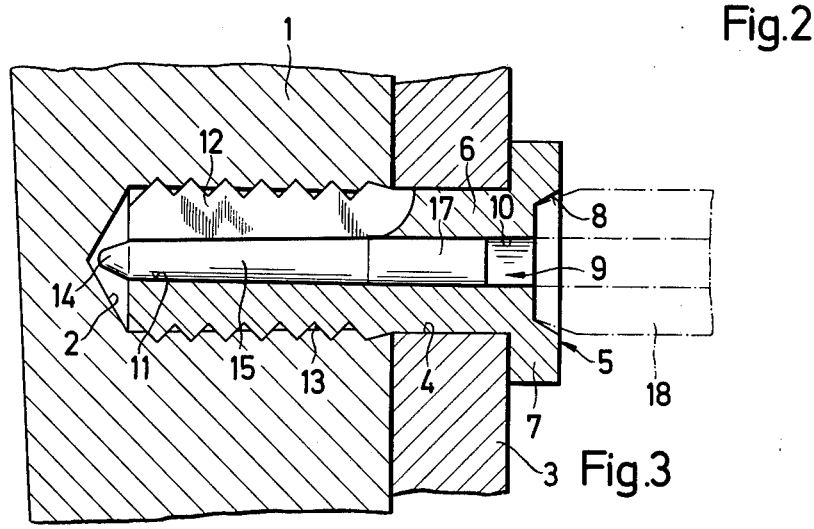

METHOD FOR REPAIRING IRON MOLDS

This is a continuation of application Ser. No. 529,841, now abandoned, filed Dec. 5, 1974, in turn, a division of Ser. No. 423,460, filed Dec. 10, 1973, now abandoned.

The present invention relates to a method for repairing damaged iron molds and similar casting devices by bridging the damaged area by means of a metal plate and attaching the metal plate by means of fastening elements inserted into prepared recesses in the iron molds and apertures in the metal plate.

It is known to repair the damaged zone of a cracked iron mold by means of a metal plate which in turn is secured in this zone of the iron mold so that a further use of the iron mold is possible. How many times the iron mold repaired in this fashion may be used thereafter depends primarily upon the quality of the highly stressed fastening or attachment of the metal plate.

A known method of repair consists in providing the metal plates with passage bores and the iron mold with corresponding blind-end bores into which metal pins, as fastening elements, are either pressed or threaded. The rearward end of these pins is either riveted or welded together with the metal plate, whereby a form-locking counter-bearing is created.

As is known from experience, the pins pressed in with a large expenditure of force have relatively small anchoring values in the iron mold wall, so that a sufficient support of the metal plate is possible only by employing a corresponding plurality of fastening points. A plurality of fastening points requires, of necessity, the same number of passage bores in the metal plate which leads, however, to a considerable weakening of the metal plate itself.

The further known threading-in of pins also has significant disadvantages. Thus, the blind-end bores of the iron mold must be provided with threads which—due to the immobility of an iron mold weighing tons—can be accomplished in turn only with mobile special tapping devices at the site of use of the iron mold. Both this operation and the threading-in of the pins is extremely time-consuming and therefore uneconomical.

Furthermore, also the riveting and/or welding of the rearward pin end with the metal plate is a separate and expensive working step or operation.

It is the object of the present invention to provide a repair method which can be carried out in an economical manner and moreover assures high supporting values of the attachments.

This object is obtained, in accordance with the present invention, by using straddling dowels adapted to be expanded by means of expanding elements, the expansion of the straddling dowels being effected by driving in the expanding elements with powder-force-actuated setting devices.

Dowels of this type, when in the unspread state, can be introduced with small application of force into the recesses, preferably provided as cylindrical bores, and advantageously having a slightly larger diameter than the dowels. The dowels are anchored by spreading once they have the desired end position. The kinetic energy of the spreading or expanding elements, actuated by powder force, is thereby converted into deforming energy and effects a radial expansion or widening of the dowels in the recesses and very high anchoring values.

In so proceeding, a very few of the attachments suffice for achieving the connection of the metal plate with the iron mold. The decisive advantage of this inventive method thus is that it can be performed without specific manual expenditure of force using conventional powder-force-actuated setting devices in a brief period of time, and very high supporting values are obtained.

The straddling dowels employed for carrying out the method of the present invention advantageously have a cylindrical shank with a circular cross-section, and at the rearward end thereof is a counter-bearing which holds the metal plate against the iron mold. For obtaining a particularly good anchoring of the straddling dowels, the length of the shank corresponds preferably to about twice the thickness of the metal plate. A counter-bearing renders unnecessary the expensive riveting and/or welding of the rear dowel end to the metal plate which, in known methods, must be carried out in a separate working step.

The counter-bearing preferably is a collar exceeding the diameter of the shaft and assuring, after the anchoring of the dowel, the required support of the metal plate, without requiring a separate working step.

Particularly in iron molds having very uneven walls, the metal plates can be brought to abut against the iron mold only with difficulty. This problem can be solved with a counter-bearing which is formed by a nut threaded on the outer dowel jacket.

In order to assure a correctly operative introduction of the expanding element into the dowel in as central a manner as possible, the rearward end face of the dowel comprises a recess serving for receiving the powder-force-actuated setting device. In a particularly advantageous manner, the recess is a conical countersink whose smallest cross-section corresponds to that of the setting device orifice. As a result, the orifice of the device will automatically assume the correctly operative position during the insertion into the countersink.

According to a further development of the present invention, the straddling dowel has a continuous axial bore whose rearward partial area or section is cylindrical, and whose forward area or section is forwardly tapered. The cylindrical partial area or section of the axial bore advantageously have a cross-section corresponding to the cross-section of the expanding element, which assures on the one hand a guide of the expanding element during the penetration thereof, while, on the other hand, a spreading or expansion of the dowel will not take place in the dowel area projecting out of the iron mold. Achieved by virtue of the tapering shape of the forward partial axial bore area or section—in addition to the guide of the expanding element—is a continuous straddling of the forward dowel portion.

An extremely small deviation of the anchoring values of the individual straddling dowels is attained by virtue of the fact that the forward area or section provided for expansion has grooves projecting from the outer dowel jacket radially toward the center and extending parallel to the dowel axis. The grooves subdivide the cross-section of the expansion area into preferably congruent sectors, which assures that the dowels will be forced apart symmetrically, whereby the anchoring forces are distributed over the entire circumference of the iron mold wall. Furthermore, these grooves render possible a relatively strongly widening spreading or expansion so that even in the case where the iron mold bores are too large and inaccurate, sufficient anchoring may be obtained. The best results are achieved with three such grooves.

The anchoring values of the novel straddling dowel may be further increased by circular radial grooves in the forward area or section of the outer dowel jacket. By such radial grooves, ribs are created which, during the expanding procedure, penetrate into the iron mold bore wall, thereby effecting a form-locking connection.

The expanding elements of the dowels preferably have a cylindrical guide part with a circular cross-section at the rearward end, and a forward partial piece adjoining the guide part or portion and being tapered toward a tip. In order to bring about an expansion in the entire dowel region extending into the iron mold, the length of the forward expanding element partial piece preferably corresponds approximately to that of the dowel section extending into the iron mold. The indicated shape of the expanding element facilitates the central penetration thereof into the axial bore and contributes to a continuous expanding operation during which a relatively limited expenditure of force is required.

In order to facilitate the penetration of the expanding element into the dowel material, the expanding element has a higher rigidity than the straddling dowel itself.

The present invention will now be further explained hereinafter with reference to the accompanying drawings, wherein FIG. 1 is a cross-sectional view through a fastening point with a straddling dowel partially inserted;

FIG. 2 is a cross-sectional view of the straddling dowel taken along line II—II of the FIG. 1, and FIG. 3 is a cross-sectional view through a fastening point with a dowel completely inserted and spread or forced apart.

A section of an iron mold wall 1, shown in FIG. 1, has a cylindrical blind-end bore 2. Placed against the iron mold wall 1 is a metal plate 3, preferably of steel and having in turn a passage bore 4 corresponding with the blind-end bore 2. A straddling dowel which has been identified in its entirety with reference numeral 5 comprises a cylindrical shank 6 with a counterbearing provided as the collar 7 at the rearward end thereof. For the purpose of the correctly or properly operative application of a setting device, a conical recess 8 is at the rear end face of the straddling dowel 5. Furthermore, an axial bore 9, beginning from the recess 8, projects into the interior of the dowel. The axial bore 9 has a rearward cylindrical partial area 10 and a forward conical partial area 11. As is apparent particularly from FIG. 2, three longitudinally-extending grooves 12, offset at the same angle with respect to each other, are disposed in the forward part or area of the dowel shank 6 serving for the expansion, whereby the shank cross-section is subdivided into several sectors. Furthermore, the dowel shank 6 has several radial grooves 13 for increasing the anchoring vaues in the forward area or section.

The attachment illustrated in FIG. 3 shows an expanding element comprising a tip 14, an adjacent partial piece 15, and a cylindrical guide part 17 at the rearward end corresponding to the diameter of the rearward partial area or section 10 of the axial bore 9. The ribs produced by means of the radial grooves 13 are lodged in the wall of the blind-end bore 2. The orifice 18 of a powder-force-actuated setting device, not further shown, is positioned in the recess 8, i.e., in the working position thereof.

It will be obvious to those skilled in the art that many modifications may be made within the scope of the present invention without departing from the spirit thereof, and the invention includes all such modifications.

What is claimed is:

1. In the method for repairing a damaged iron mold and similar casting devices by bridging the damaged area with a metal plate and securing the plate by means of fastening elements inserted into apertures in the plate and prepared recesses in the iron mold, the improvement which comprises shooting headed expansible hollow straddling dowels in said apertures and recesses, and radially expanding only the forward portions of said dowels with a powder-force-actuated setting device having an orifice of said setting device placed in a central bore of a dowel to be expanded.

* * * * *